United States Patent

Bell

[15] 3,644,770

[45] Feb. 22, 1972

[54] PHOTOEMITTER HAVING A P-TYPE SEMICONDUCTIVE SUBSTRATE OVERLAID WITH CESIUM AND N-TYPE CESIUM OXIDE LAYERS

[72] Inventor: Ronald L. Bell, Woodside, Calif.

[73] Assignee: Varian Associates, Palo Alto, Calif.

[22] Filed: Jan. 18, 1968

[21] Appl. No.: 698,941

Related U.S. Application Data

[63] Continuation-in-part of Ser. No. 660,722, Aug. 15, 1967, abandoned.

[52] U.S. Cl. .................................. 313/94, 313/65, 313/101

[51] Int. Cl. .................................. H01j 39/06, H01j 31/50

[58] Field of Search .................................. 313/65, 65 A, 94

[56] References Cited

UNITED STATES PATENTS

| | | | |
|---|---|---|---|
| 3,275,869 | 9/1966 | Feist | 313/65 |
| 3,310,701 | 3/1967 | Heimann | 313/94 |
| 3,330,991 | 7/1967 | Lavine et al. | 313/94 X |
| 3,387,161 | 6/1968 | Van Laar et al. | 313/94 |
| 3,408,521 | 10/1968 | Dore et al. | 313/94 |

OTHER PUBLICATIONS

Scheer et al., " GaAs- Cs: A New Type of Photoemitter" ; Solid State Communications; Vol. 3, pp. 189- 193. 1965

*Primary Examiner*—Robert Segal
*Attorney*—William J. Nolan and Leon F. Herbert

[57] ABSTRACT

A junction-type photoemitter is disclosed. The photoemitter includes a heavily doped P-type semiconductive substrate for absorbing photons of radiation to be converted into electrons to be emitted. An alkali metal layer such as cesium metal is formed over the substrate member for filling the surface energy states of the P-semiconductive substrate. Finally, a layer of cesium oxide is formed over the alkali metal layer to provide a low-work function surface facing the vacuum into which the electrons are emitted from the photoemitter. The substrate member may be made of a III–V compound semiconductor or an alloy of two different III–V compound semiconductors (each compound semiconductor including one element from the third group of Periodic Table and another element of the fifth group of the Periodic Table) to provide a semiconductive band-gap energy which is equal to or slightly more than the work function of the cesium oxide layer. The P-type semiconductive substrate member is heavily doped with a concentration of acceptor dopant greater than $3\times10^{18}$ acceptors per cubic centimeter. Likewise, the cesium oxide layer is heavily doped with donor atoms of cesium to provide the relatively low-work function characteristic of such material. In a preferred embodiment, the P-semiconductive substrate is formed of InP or an alloy of InP and InAs. The photoemitter has improved conversion efficiency in the wavelength range from 0.5 microns to 1.37 microns wavelength.

14 Claims, 6 Drawing Figures

INVENTOR.
RONALD L. BELL
BY [signature]
ATTORNEY

INVENTOR.
RONALD L. BELL
BY Wm. J. Nolan
ATTORNEY

PHOTOEMITTER HAVING A P-TYPE SEMICONDUCTIVE SUBSTRATE OVERLAID WITH CESIUM AND N-TYPE CESIUM OXIDE LAYERS

This is a continuation-in-part of Ser. No. 660,722 filed Aug. 15, 1967 now abandoned.

DESCRIPTION OF THE PRIOR ART

Heretofore, it has been proposed to construct photoemitters comprising a semiconductive substrate to gallium arsenide heavily doped with P-type dopant and coated on the surface with a monolayer of cesium metal. Such a photoemitter is described in an article entitled, "GaAs-Cs: A New Type of Photoemitter," appearing in Solid State Communications, Vol. 3, pp. 189–193 (1965). In this prior photoemitter, the P-type semiconductive substrate was fabricated to have a semiconductive band gap of about 1.4 electron volts which was equal to the work function of the cesium layer. The photoemitter had a threshold for optical radiation at 0.8 micron and provided improved response as compared with S–20 type photoemitters in the spectral range of wavelengths below 0.8 micron. However, for wavelengths longer than the threshold of 0.8 micron the earlier AgOCs (S–1) type photoemitters provided approximately 1 percent conversion efficiency from 0.8 micron to a threshold at 1.2 microns. Thus, the prior S–1 photoemitters are superior in the infrared range of wavelengths from 0.8 micron to 1.2 microns. A need exists for an improved photoemitter operating in the infrared range of wavelengths from 0.6 micron to 1.375 microns.

SUMMARY OF THE PRESENT INVENTION

The principal object of the present invention is the provision of an improved photoemitter having improved performance in the near infrared range of wavelengths.

One feature of the present invention is the provision of a photoemitter having a heavily P-doped semiconductive substrate formed of a compound semiconductor or an alloy of compound semiconductors of the third and fifth columns of the Periodic Table coated with an alkali metal layer and having an N-type cesium oxide emitting surface facing the vacuum, whereby improved photoemitter conversion efficiency is provided in the near infrared range of wavelengths.

Another feature of the present invention is the same as the preceding feature wherein the semiconductive band-gap energy of the substrate member is selected to be equal to or slightly greater than the work function of the N-type cesium oxide emitting layer.

Another feature of the present invention is the same as the preceding feature wherein the alkali metal layer intermediate the P-type semiconductive substrate and the cesium oxide emitting layer is made of cesium having a characteristic thickness less than five monolayers thick.

Another feature of the present invention is the same as any one or more of the preceding features wherein the semiconductive substrate member is made of heavily P-doped InP or a heavily P-doped alloy consisting of InP and InAs with a preponderance of the alloy consisting of InP, whereby the semiconductive band-gap energy is substantially equal to or slightly greater than the work function of the N-type cesium oxide emitting layer.

Other features and advantages of the present invention will become apparent upon a perusal of the following specification taken in connection with the accompanying drawings wherein:

DESCRIPTION OF THE PREFERRED EMBODIMENTS

Figure 1:
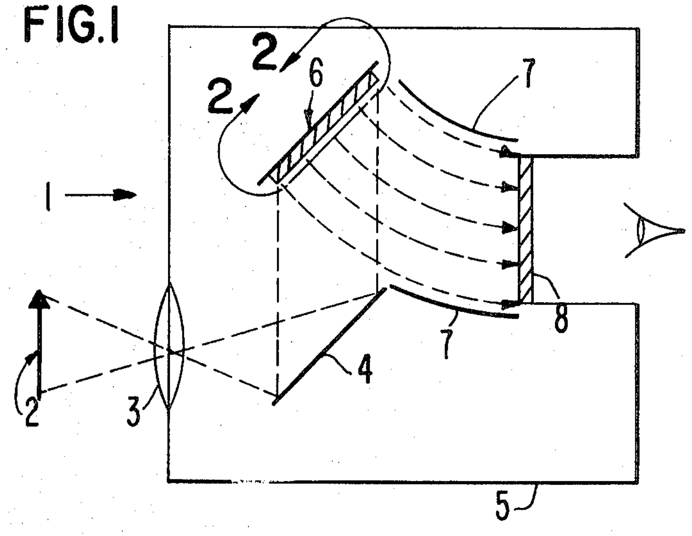
FIG. 1 is a schematic line diagram, in section, depicting an infrared image converter employing the photoemitter of the present invention.

Referring now to FIG. 1 there is shown an infrared image intensifier tube 1 incorporating features of the present invention. An object 2, to be viewed, gives off or reflects optical radiation in the near infrared spectrum. The rays emanating from the object 2 are focused on the photosensitive surface through a lens 3 and a 45° mirror 4 disposed within an evacuated envelope 5, evacuated to a suitably low pressure as of $10^{-9}$ Torr. The image of the object 2 is reflected from the mirror 4 onto the photoemitter 6 for converting the near infrared image into a corresponding electron image emitted from the photoemitter 6. The electron image is accelerated to a relatively high voltage as of 30 kv. via accelerating electrodes 7 and focused onto a fluorescent screen 8. The optical image appearing on the fluorescent screen is a greatly intensified image of the object 2 and is viewed through the fluorescent screen 8 by the eye or other suitable optical pickup device.

Figures 2, 3, 5:
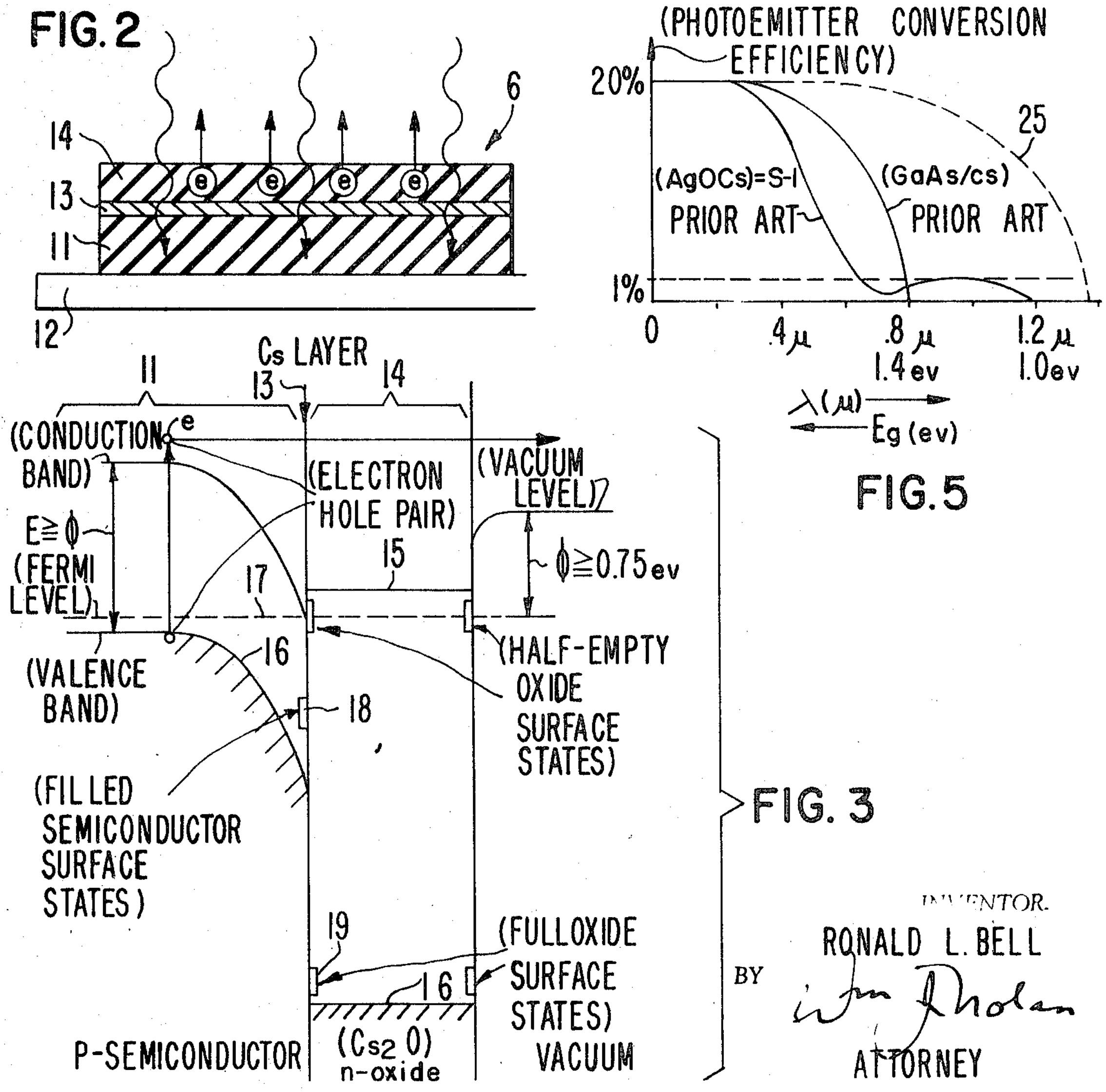
FIG. 2 is an enlarged sectional view of a portion of the structure of FIG. 1 delineated by line 2—2.
FIG. 3 is an energy level diagram for the photoemitter of the present invention.
FIG. 5 is a plot of photoemitter conversion efficiency in percent vs. wavelength in microns and energy gap in electron volts for the S–1, GaAs/Cs photoemitters together with the photoemitter of the present invention.

Referring now to FIG. 2 the photoemitter 6 is shown in greater detail. The photoemitter 6 includes a heavily doped P-type semiconductive substrate 11 supported upon a conductive electrode 12. A layer of alkali metal 13, up to five monolayers thick, is formed on the clean surface of the semiconductive layer 11 for filling the surface energy states of the semiconductive layer 11. A layer of cesium oxide ($Cs_2O$) 14 is formed on the alkali metal layer 13.

In operation, optical radiation in the near infrared range and forming the image to be converted falls upon the photoemitter 6 and passes through the cesium oxide and alkali metal layers 14 and 13, respectively, and is absorbed in the P-semiconductive layer 11. Upon absorption, the near infrared radiation produces electron-hole pairs in accordance with the optical image and the electrons pass through the alkali metal layer 13 and cesium oxide layer 14 and are emitted into the vacuum to form the electron image accelerated to the fluorescent screen 8.

Referring now to FIG. 3 there is shown an energy level diagram for the photoemitter of FIG. 2. More specifically, the heavily doped P-type semiconductive substrate 11 is selected to have a semiconductive energy band gap $E_g$ equal to or slightly greater than the work function $\phi$ of the cesium oxide layer 14. The junction of the P-semiconductive layer 11 with the cesium oxide layer 14 causes a severe band bending of the conduction band levels 15 and the valence band levels 16 in the P-semiconductive layer 11. The P-type semiconductive material 11 is heavily doped to bring the Fermi level within the semiconductive material near to the top of the valence band 16. The cesium oxide layer 14 is heavily doped with N-type material such that its Fermi level is brought near to the bottom of its conduction band 15.

The junction between the two layers causes the conduction band within the P-type semiconductive material 11 to be pinned to the Fermi level 17 within the cesium oxide layer 14. The cesium layer 13, intermediate the P-semiconductive layer 11 and the cesium oxide layer 14, serves to fill the surface energy states 18 and 19, respectively, of the P-semiconductor 11 and the cesium oxide layers 11 and 14, respectively, at the junction. As a result, these surface states 18 and 19 do not draw charge carriers from the cesium oxide layer which might otherwise set up local potential gradients at the junction to interfere with transfer of electrons $e$ from the P-type semiconductive material 11 through the cesium oxide layer 14 to the vacuum.

Figure 4:
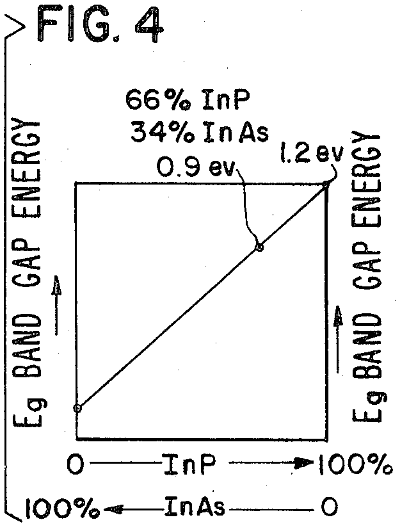
FIG. 4 is a phase diagram depicting the band-gap energy vs. percent composition for an alloy of InP and InAs.

Suitable semiconductive materials for the semiconductive substrate layer 11 include certain compound semiconductors wherein the compound semiconductor is formed of a compound of elements selected from the third and fifth columns of the Periodic Table also alloys of two different ones of such compound III–V semiconductors may be employed. For example, alloys of InAs and GaAs, InP and InAs, or GaSb and GaAs, when properly proportioned, provide a semiconductive band gap $E_g$ which is equal to or greater than the work function $\phi$ of the N-cesium oxide which is greater than 0.75 electron volts. More particularly, a suitable P-semiconductor alloy having a band gap energy $E_g$ of 0.9 electron volts is provided by an alloy consisting of 66 percent InP and 34 percent InAs. This particular ratio was arrived at by reference to the phase diagram of FIG. 4 which shows that pure InP has a band gap energy $E_g$ of 1.2 electron volts, whereas 100 percent InAs has a band gap energy $E_g$ of 0.3 electron volts. The P-semiconductive layer 11 is heavily doped with P-type dopant having a sufficient solubility in the substrate material such as, for example, zinc or beryllium. As used herein, "heavily doped" means that the concentration of acceptors is greater than $3\times10^{18}$ per cubic centimeter. A concentration of $4\times10^{19}$ zinc atoms per cubic centimeter of the semiconductor alloy 11 provides a suitable amount of heavy doping. The doping is preferably less than $5\times10^{20}$ acceptors per cubic centimeter.

The alkali metal layer 13 may comprise suitable alkali metals such as for example, cesium or sodium. The alkali metal layer 13 is preferably less than five monolayers thick and is typically one or two monolayers thick. The alkali metal layer 13 is conveniently formed onto the semiconductive substrate 11 by vapor deposition in an ultraclean vacuum vaporization chamber. Use of cesium as the alkali metal is particularly convenient since the cesium layer may be deposited to a thickness of 10 or more monolayers and then activated by oxygen to form the cesium oxide layer 14 on the outside of the pure cesium layer 13 which is defined by the remainder of the original layer of cesium which has not been oxidized. By controlling the amount of oxidation of the cesium oxide layer 14, the heavily doped N-type cesium oxide 14 is likewise obtained because the excess cesium provides the donor-doping for the cesium oxide layer 14. As in the case of the heavy doping for the P-type semiconductive layer 11, the N-type cesium layer 14 should have a concentration of excess cesium (donor atoms) falling within the range of $5\times10^{18}$ to $5\times10^{20}$ donors per cubic centimeter. The heavily doped N-type cesium oxide layer 14 will typically have a work function of about 0.9 electron volts. This work function can be increased by decreasing the concentration of the doping.

The proper doping of the N-type cesium oxide 14 is conveniently obtained by controlling the oxidation of the cesium oxide layer while monitoring the electron emission from the photoemitter as it is being irradiated by optical radiation of a wavelength for which the photoemitter 6 is to be optimized. When the desired conversion efficiency is obtained, the oxidation is stopped. For example, a (110) surface of an InP crystal, doped with $5\times10^{18}$/cm.$^3$ zinc acceptors, is exposed by cleaving in vacuum at $6\times10^{-11}$ Torr. Cesium is then deposited to a thickness on the order of one monolayer thick on the clean-cleaved (110) surface. Oxygen is then admitted while observing photoemission from the cathode. The photoelectric yield is alternately "poisoned" by adding a fractional monolayer of Cs, and then revived by oxygenation until optimum photoelectric yield is obtained. Optimum coverage corresponds to an initial $10^{15}$/cm.$^2$ cesium coverage, with an additional apparent $1.6\times10^{15}$/cm.$^2$ oxygen atoms and $1.6\times10^{15}$/cm.$^2$ cesium atoms. These are of the order of monolayer quantities and produce a cesium layer of 2 to 5 A. thick and a $Cs_2O$ layer thickness of approximately 15 A.

Figure 6:
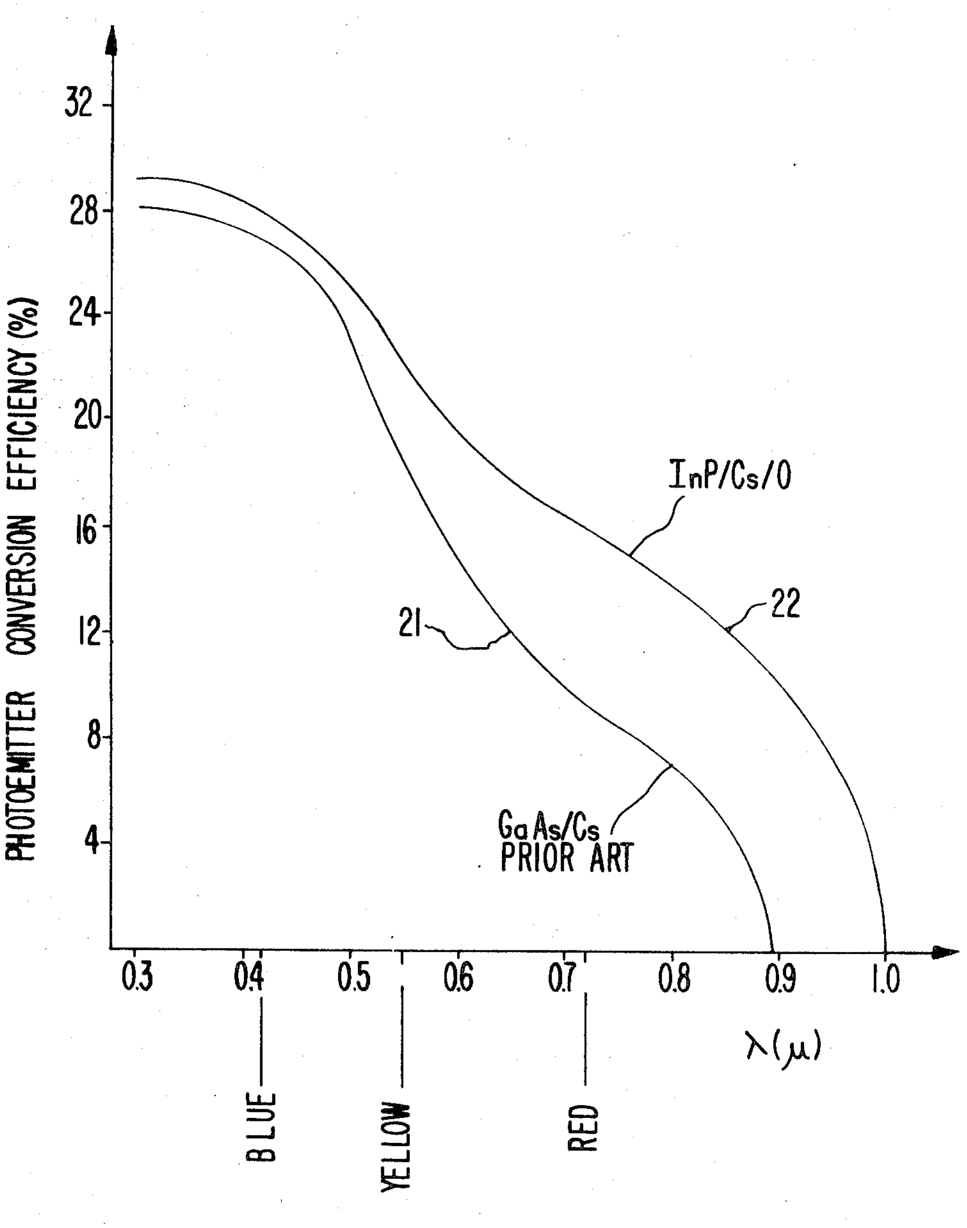
FIG. 6 is an enlarged plot similar to that of FIG. 5 depicting the photoemission characteristic of InP/Cs/O and GaAs/Cs.

The resultant photoemitter 6 has substantially improved conversion efficiency as compared with the prior art GaAs/Cs photocathode. See FIG. 6, where curve 21 depicts the photoemitter conversion efficiency versus wavelength of the optical irradiation for the prior art GaAs/Cs photocathode and where curve 22 shows the efficiency obtained by an InP/Cs/O photoemitter of the present invention. Note that the conversion efficiency and threshold are substantially improved and extended for red and longer wavelengths for the photocathode of the present invention. The provision of $Cs_2O$ is critical to the improved performance of the InP photoemitter since the photoelectric yield for InP/Cs is substantially less than that obtained for GaAs/Cs.

It is desired that the acceptor doping of the P-type semiconductor substrate be kept near the lower end of the acceptable P+ doping range of $3\times10^{18}$ to $5\times10^{20}$/cm.$^3$ in order to keep the electron diffusion length Ld in the bulk material as long as possible. Undesired energy losses are associated with collisions sustained by the photoelectrons in diffusing out of the bulk material and through the junction. Defects in the bulk material such as dislocations and impurity sites shorten the electron diffusion length. Zinc doping at $5\times10^{18}$/cm.$^3$ in a low defect InP crystal should yield room temperature electron diffusion lengths to approximately 1,000 A. and will lead to the improved performance shown by curve 22 of FIG. 6.

Referring now to FIG. 5 there is shown photoemitter conversion efficiency vs. wavelength of the optical radiation in microns and the energy gap in electron volts for the InP/InAs/$Cs_2O$ photoemitter 6. As seen from FIG. 5, the conventional S–1 (AgOCs) photoemitter has an optimum response at about 0.4 micron wavelength for the radiation to be detected and a very low efficiency on the order of 1 percent for radiation in the near infrared range of wavelengths from 0.7 micron to 1.2 microns. This figure also shows the 1 conversion efficiency for the GaAs/Cs photoemitter. It is seen that this cathode has improved conversion efficiency for wavelengths below its threshold at 0.8 micron but is not suitable for detection of optical radiation with wavelengths longer than 0.8 micron. The dotted line 25 shows the photoemission conversion efficiency for the photoemitter of the present invention and it is seen that such a photoemitter has improved conversion efficiency for wavelengths in the range from 0.8 micron to 1.3 microns.

Although the photoemitter 6 of the present invention has been described in FIGS. 1 and 2 as a reflective photoemitter, i.e., the electrons are emitted from the same surface receiving the incident optical radiation, this is not a requirement for the photoemitter of the present invention and it may be used in applications where the photon image is received on one side of the photocathode and the electrons are emitted from the opposite side of the photoemitter.

Since many changes could be made in the above construction and many apparently widely different embodiments of this invention can be made without departing from the scope thereof it is intended that all matter contained in the above description or shown in the accompanying drawings shall be interpreted as illustrative and not in a limiting sense.

What is claimed is:

1. In a photoemitter, means forming a P-type compound semiconductive substrate structure for absorbing photons of radiation to produce electrons for emission, said substrate being formed of a compound of elements selected from the third and fifth columns of the Periodic Table, and said substrate member being doped with acceptor dopant to a concentration greater than $3\times10^{18}$ acceptors per cubic centimeter of the substrate to produce a heavily doped P-type semiconductive substrate, the improvement comprising, means forming a layer of N-type cesium oxide material overlaying said substrate to facilitate emission of the photon produced electrons into an evacuated region adjacent said layer of cesium oxide, means forming a layer of alkali metal disposed intermediate said substrate structure and said cesium oxide layer for filling the surface energy states of said substrate and cesium oxide layers.

2. The apparatus of claim 1 wherein said heavily doped P-type semiconductive substrate material has a semiconductive band-gap energy at least equal to the work function of said N-type cesium oxide.

3. The apparatus of claim 1 wherein said heavily doped P-type semiconductive substrate material has a semiconductive band-gap energy greater than 0.75 electron volts and at least equal to the work function of said N-type cesium oxide material.

4. The apparatus of claim 1 wherein said substrate is formed of InP.

5. The apparatus of claim 1 wherein said intermediate layer of alkali metal is a layer of cesium alkali metal.

6. The apparatus of claim 5 wherein said intermediate cesium metal layer has a characteristic thickness less than five atoms thick.

7. The apparatus of claim 1 wherein said P-type semiconductive substrate material is formed by an alloy of first and second different compound semiconductors, each of said first and second compound semiconductors being formed of compounds of elements selected from the third and fifth column of the Periodic Table.

8. The apparatus of claim 7 wherein said P-type semiconductive substrate material includes an alloy of InP and InAs.

9. The apparatus of claim 8 wherein said acceptor dopant is selected from the class consisting of zinc and beryllium.

10. The apparatus of claim 8 wherein said substrate alloy includes a preponderance by mole ratio of InP.

11. The apparatus of claim 10 wherein said P-type semiconductive substrate alloy comprises approximately 66 percent InP and approximately 34 percent InAs.

12. The apparatus of claim 7 wherein said P-type semiconductive substrate alloy material includes an alloy selected from the class consisting of InAs and GaAs, and GaSb and GaAs.

13. The apparatus of claim 9 wherein the concentration of said dopant is approximately $5\times10^{18}/cm.^3$.

14. The apparatus of claim 4 wherein said InP substrate is doped with zinc dopant to a concentration of approximately $5\times10^{18}cm.^3$.

* * * * *